(12) United States Patent
Hosey et al.

(10) Patent No.: US 8,941,506 B2
(45) Date of Patent: Jan. 27, 2015

(54) METHODS AND SYSTEMS FOR IDENTIFYING WIRING OF A TELEMATICS SYSTEM

(71) Applicant: General Motors LLC, Detroit, MI (US)

(72) Inventors: Eric T. Hosey, Rochester, MI (US); Kevin W. Owens, Sterling Heights, MI (US); Daniel C. McGarry, Oxford, MI (US); Joshua M. Sine, Beverly Hills, MI (US)

(73) Assignee: General Motors LLC, Detroit, MI (US)

( * ) Notice: Subject to any disclaimer, the term of this patent is extended or adjusted under 35 U.S.C. 154(b) by 291 days.

(21) Appl. No.: 13/646,361

(22) Filed: Oct. 5, 2012

(65) Prior Publication Data

US 2014/0097959 A1     Apr. 10, 2014

(51) Int. Cl.
*G08B 21/00*     (2006.01)
(52) U.S. Cl.
USPC ......... 340/635; 340/425.5; 307/9.1; 307/10.1
(58) Field of Classification Search
CPC ....... G01R 31/041; G01R 31/04; G01R 31/02
USPC ........................ 340/635, 425.5; 307/9.1, 10.1
See application file for complete search history.

(56) References Cited

U.S. PATENT DOCUMENTS

| 8,463,494 B2 * | 6/2013 | Peariso et al. ................. 701/36 |
| 2012/0089298 A1 | 4/2012 | Peariso et al. | |

OTHER PUBLICATIONS

Patenaude, Russell A., Systems and Methods for Detecting an Error in the Installation of an Electrical Component, U.S. Appl. No. 13/094,662, filed Apr. 26, 2011.

* cited by examiner

*Primary Examiner* — Andrew Bee
(74) *Attorney, Agent, or Firm* — Ingrassia Fisher & Lorenz, P.C.

(57) ABSTRACT

Methods and systems are provided for detecting a power line of a telematics unit is incorrectly wired. In one example, a system includes a first module that evaluates at least one of a validity of a global positioning system and a powered on status of the telematics unit. A second module determines that the power line of the telematics unit is incorrectly wired based on the at least one of the validity of a global positioning system and the powered on status.

20 Claims, 6 Drawing Sheets

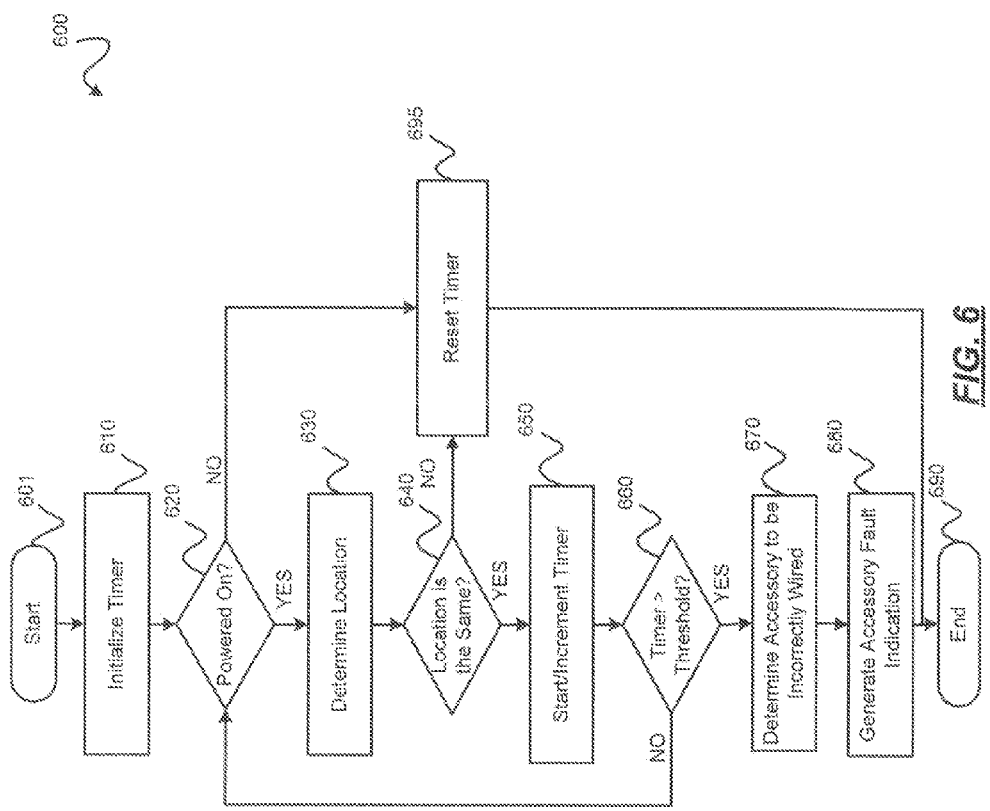

METHODS AND SYSTEMS FOR IDENTIFYING WIRING OF A TELEMATICS SYSTEM

TECHNICAL FIELD

The technical field generally relates to telematics systems, and more particularly relates to methods and systems for identifying wiring of a telematics system and alerting a third party to any identified incorrect wiring.

BACKGROUND

Telematics services are services that are provided by a call center to a vehicle and/or to the operator of a vehicle that relate to various needs of the vehicle or the operator. Telematics services commonly include, but are not limited to, the remote monitoring of vehicle maintenance needs, the provision of turn by turn navigation guidance, the coordination of emergency services during vehicle emergencies, the provision of door unlock services when the vehicle's owner is locked out of the vehicle, and the provision of theft tracking services after a vehicle has been stolen, to name just a few.

An example telematics service system includes a telematics unit mounted to the vehicle, a call center located remotely from the vehicle, and a communication network that communicatively connects the two. In a known example, the telematics unit has been embedded in the vehicle (i.e., mounted to the vehicle during vehicle assembly) and directly connected to the vehicle bus. This connection to the vehicle bus permits the telematics unit to provide many of the telematics services (e.g., remote door unlock).

Because of the popularity of telematics services, aftermarket telematics units are also in the market place. Such aftermarket telematics units make it possible for drivers of vehicles that lack an embedded telematics unit to, nevertheless, receive some or all of the available telematics services. In a known example, the aftermarket telematics unit is wired into the vehicle's electrical system or battery to draw the power that is needed to operate the aftermarket telematics unit. To receive electrical power from the vehicle, the aftermarket telematics unit includes a constant power line, a switched power line, and a ground line that are configured to be connected to a constant power line, a switched power line, and a ground line, respectively, of the vehicle.

In a known example, when the electrical lines of the aftermarket telematics unit are correctly connected to the respective electrical lines of the vehicle, the power state of the aftermarket telematics unit will correspond with the power state of the vehicle. For example, the aftermarket telematics unit is configured to operate in three different power states; an on-mode when the vehicle is powered on (i.e., when the vehicle's ignition is turned to either the run or the accessory position), a standby-mode when the vehicle is powered off (e.g., when the vehicle's ignition is turned to the off position), and an off-mode when the vehicle has been powered off for greater than a predetermined length of time, typically five consecutive days.

When in the on-mode, the aftermarket telematics unit is configured to provide its full range of services to the vehicle and the operator. All of the aftermarket telematics unit's systems are activated and ready to receive commands/inputs. When in the standby-mode, the majority of the systems of the aftermarket telematics unit are powered down and only a few of the aftermarket telematics unit's systems remain either activated or cycle through alternating periods of sleep and wakefulness. This allows the aftermarket telematics unit to receive communications from the call center even while the vehicle is turned off, without excessively draining the battery. When in the off-mode, virtually all of the systems of the aftermarket telematics unit are powered down to minimize battery drain.

If the three electrical lines of the aftermarket telematics unit are not connected to the correct respective electrical lines of the vehicle, the power state of the aftermarket telematics unit may not properly correspond with the power state of the vehicle. This, in turn, may cause some or all of the telematics services to be unavailable to the customer and/or the vehicle during certain periods of vehicle operation.

Accordingly, it is desirable to provide methods and systems for monitoring the wiring of the telematics units. Furthermore, other desirable features and characteristics of the present invention will become apparent from the subsequent detailed description and the appended claims, taken in conjunction with the accompanying drawings and the foregoing technical field and background.

SUMMARY

Methods and systems are provided for detecting whether a power line of a telematics unit is incorrectly wired. In one non-limiting example, a system includes, but is not limited to, a first module that evaluates at least one of a validity of a global positioning system and a powered on status of the telematics unit. The system further include, but is not limited to, a second module that determines that the power line of the telematics unit is incorrectly wired based on the at least one of the validity of a global positioning system and the powered on status.

In another non-limiting example, a method is provided for detecting whether a constant power line of a telematics unit is incorrectly wired. The method includes, but is not limited to, evaluating a validity of a global positioning system; determining that the constant power line of the telematics unit is incorrectly wired based on the evaluating; and generating an alert signal indicating that the constant power line is incorrectly wired based on the determining.

In yet another non-limiting example, a method is provided for detecting whether an accessory power line of a telematics unit is incorrectly wired. The method includes, but is not limited to, evaluating a powered on status of the telematics unit; managing a timer based on the powered on status; determining that the accessory line of the telematics unit is incorrectly wired based on the timer; and generating an alert signal indicating that the constant power line is incorrectly wired based on the determining.

DESCRIPTION OF THE DRAWINGS

The disclosed examples will hereinafter be described in conjunction with the following drawing figures, wherein like numerals denote like elements, and wherein:

FIGS. 3-6 are flowcharts illustrating non-limiting examples of monitoring methods that may be performed by the telematics unit of the telematics system.

DETAILED DESCRIPTION

The following detailed description is merely exemplary in nature and is not intended to limit the application and uses.

Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
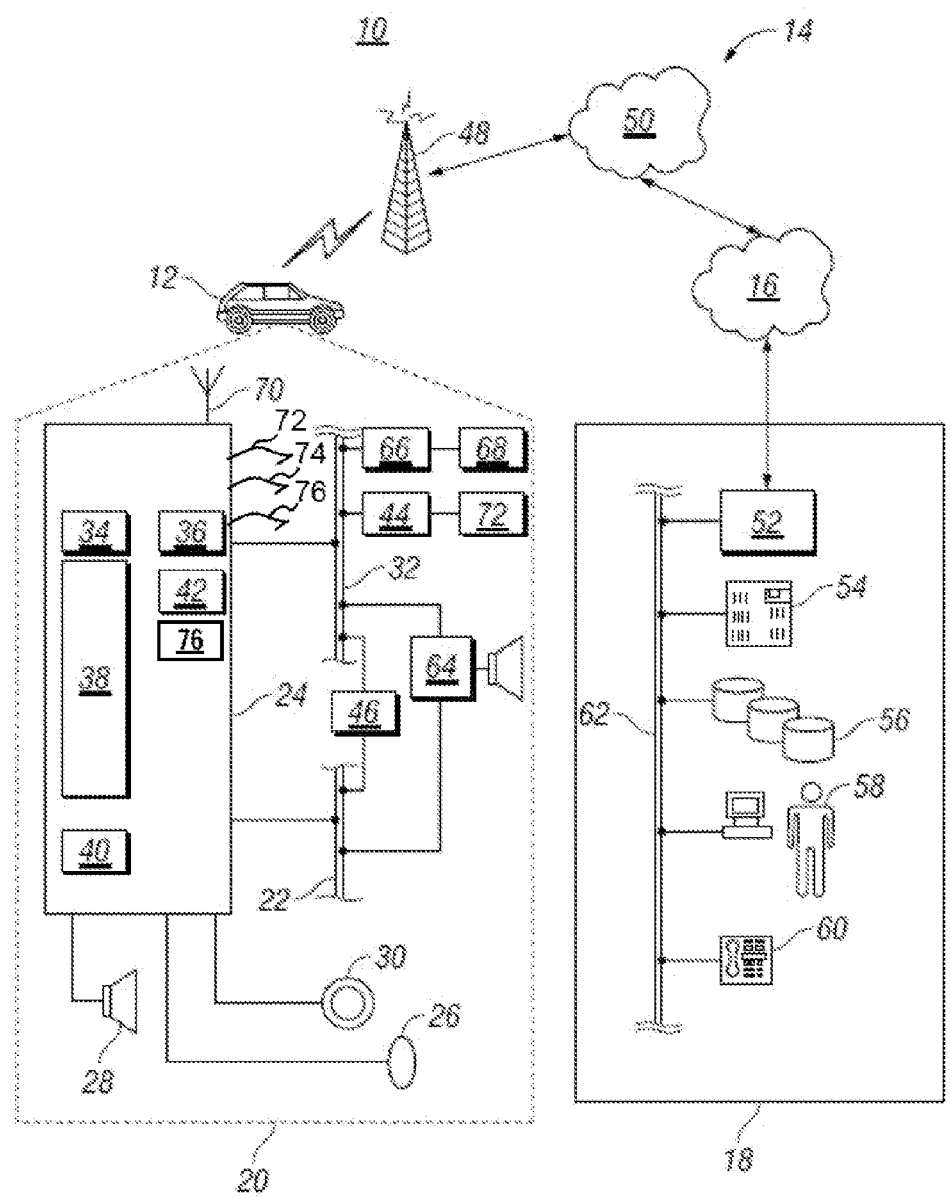
FIG. 1 is a diagram illustrating a non-limiting example of a telematics system.

Referring now to FIG. 1, there is shown a non-limiting example of a telematics system 10 that is compatible for use with the systems and the methods for detecting an error in the installation of an electrical component described herein. Telematics system 10 generally includes a vehicle 12, a wireless carrier system 14, a land network 16 and a call center 18. It should be appreciated that the overall architecture, setup and operation, as well as the individual components of the illustrated system are merely exemplary and that differently configured communication systems may also be utilized to implement the examples of the method disclosed herein. Thus, the following paragraphs, which provide a brief overview of the illustrated telematics system 10, are not intended to be limiting.

Vehicle 12 may be any type of mobile vehicle such as a motorcycle, car, truck, recreational vehicle (RV), boat, plane, etc., and is equipped with suitable hardware and software that enables it to communicate over telematics system 10. Some of the vehicle hardware 20 is shown generally in FIG. 1 including a telematics unit 24, a microphone 26, a speaker 28, and buttons and/or controls 30 connected to the telematics unit 24. Operatively coupled to the telematics unit 24 is a network connection or vehicle bus 32. Examples of suitable network connections include a controller area network (CAN), a media oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is an onboard device that provides a variety of services through its communication with the call center 18, and generally includes an electronic processing device 38, one or more types of electronic memory 40, a cellular chipset/component 34, a wireless modem 36, a dual mode antenna 70, and a navigation unit containing a GPS chipset/component 42. In one example, the wireless modem 36 includes a computer program and/or set of software routines adapted to be executed within processing device 38.

The telematics unit 24 may provide various services including: turn-by-turn directions and other navigation-related services provided in conjunction with the GPS chipset/component 42; airbag deployment notification and other emergency or roadside assistance-related services provided in connection with various crash and/or collision sensor interface modules 66 and collision sensors 68 located throughout the vehicle; and/or infotainment-related services where music, internet web pages, movies, television programs, videogames, and/or other content are downloaded by an infotainment center 46 operatively connected to the telematics unit 24 via vehicle bus 32 and audio bus 22. In one example, downloaded content is stored for current or later playback. The above-listed services are by no means an exhaustive list of all the capabilities of telematics unit 24, but are simply an illustration of some of the services that the telematics unit may be capable of offering. It is anticipated that telematics unit 24 may include a number of additional components in addition to and/or different components from those listed above.

As can be appreciated, the telematics unit 24 may be provided during vehicle manufacture or may be an aftermarket telematics unit. Conventional aftermarket telematics units are disclosed in pending U.S. patent application Ser. No. 12/787,472 filed on May 26, 2010, and also in U.S. Publication No. 2005/0273211 published on Dec. 8, 2005, both of which are hereby incorporated herein by reference in their entirety.

In the telematics unit shown, vehicle communications may use radio transmissions to establish a voice channel with wireless carrier system 14 so that both voice and data transmissions can be sent and received over the voice channel. Vehicle communications are enabled via the cellular chipset/component 34 for voice communications and the wireless modem 36 for data transmission. In order to enable successful data transmission over the voice channel, wireless modem 36 applies some type of encoding or modulation to convert the digital data so that it can be communicated through a vocoder or speech codec incorporated in the cellular chipset/component 34. Any suitable encoding or modulation technique that provides an acceptable data rate and bit error can be used with the present examples. Dual mode antenna 70 services the GPS chipset/component 42 and the cellular chipset/component 34.

Microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and call center 18 to communicate with the occupants through audible speech. The vehicle hardware also includes one or more buttons and/or controls 30 for enabling a vehicle occupant to activate or engage one or more of the vehicle hardware components 20. For example, one of the buttons and/or controls 30 can be an electronic pushbutton used to initiate voice communication with call center 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22.

The vehicle crash and/or collision detection sensor interface 66 is operatively connected to the vehicle bus 32. The collision sensors 68 provide information to the telematics unit via the crash and/or collision detection sensor interface 66 regarding the severity of a vehicle collision, such as the angle of impact and the amount of force sustained.

Vehicle sensors 72, connected to various sensor interface modules 44 are operatively connected to the vehicle bus 32. Example vehicle sensors include but are not limited to gyroscopes, accelerometers, magnetometers, emission detection, and/or control sensors, and the like. Example sensor interface modules 44 include powertrain control, climate control, and body control, to name but a few.

Wireless carrier system 14 may be a cellular telephone system or any other suitable wireless system that transmits signals between the vehicle hardware 20 and land network 16. According to an example, wireless carrier system 14 includes one or more cell towers 48, base stations and/or mobile switching centers (MSCs) 50, as well as any other networking components required to connect the wireless carrier system 14 with land network 16. As appreciated by those skilled in the art, various cell tower/base station/MSC arrangements are possible and could be used with wireless carrier system 14. For example, a base station and a cell tower could be co-located at the same site or they could be remotely located, and a single base station could be coupled to various cell towers or various base stations could be coupled with a single MSC, to list but a few of the possible arrangements. A speech codec or vocoder may be incorporated in one or more of the base stations, but depending on the particular architecture of the wireless network, it could be incorporated within a Mobile Switching Center or some other network components as well.

Land network 16 can be a conventional land-based telecommunications network that is connected to one or more landline telephones, and that connects wireless carrier system 14 to call center 18. For example, land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

Call center 18 is designed to provide the vehicle hardware 20 with a number of different system back-end functions and, according to the example shown here, generally includes one or more switches 52, servers 54, databases 56, advisors 58, as well as a variety of other telecommunication/computer equipment 60. These various call center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either the live advisor 58 or an automated response system, and data transmissions are passed on to a modem or other piece of telecommunication/computer equipment 60 for demodulation and further signal processing. The modem or other telecommunication/computer equipment 60 may include an encoder, as previously explained, and can be connected to various devices such as a server 54 and database 56. For example, database 56 could be designed to store subscriber profile records, subscriber behavioral patterns, or any other pertinent subscriber information. Although the illustrated example has been described as it would be used in conjunction with a manned call center 18, it will be appreciated that the call center 18 can be any central or remote facility, manned or unmanned, mobile or fixed, to or from which it is desirable to exchange voice and data.

According to the present disclosure, the telematics unit 24 includes methods and systems for detecting an error in the installation of the telematics unit 24 into the vehicle 12. In particular, the telematics unit 24 includes a ground line 70, an accessory or switched power line 72, and a constant power line 74. These electrical lines 70-74 are configured to connect to a corresponding ground line (not shown), switched power line (not shown), and constant power line (not shown) of vehicle 12. When correctly connected to the corresponding power lines of vehicle 12, telematics unit 24 will draw power from constant power line 74 and will power on or enter a standby-mode when the switched power line of vehicle 12 indicates that vehicle 12 is powered on or off, respectively.

In one non-limiting example, the system for detecting an error in the installation of the telematics unit 24 includes a wiring monitoring module 76. The wiring monitoring module 76 monitors various conditions of the telematics unit 24 to determine if the wiring of the electrical lines 70-74 is correct and generates alerts (e.g., using one or more of the components of the telematics system 10) to third parties to notify the third party of any incorrect wiring.

Figure 2:
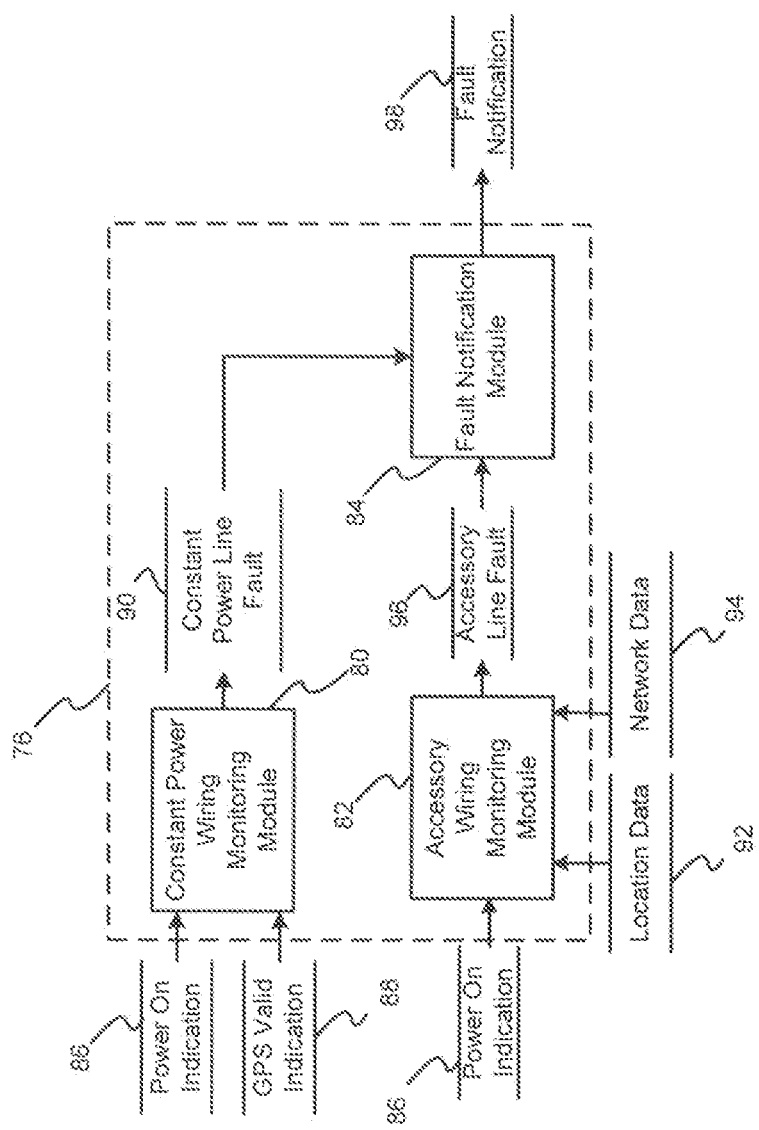
FIG. 2 is a dataflow diagram illustrating a non-limiting example of a module of a telematics unit of the telematics system.

Referring now to FIG. 2 and with continued reference to FIG. 1, a dataflow diagram illustrates an example of a wiring monitoring module 76 with more detail. Various examples of wiring monitoring modules 76 according to the present disclosure may include any number of sub-modules. As can be appreciated, the sub-modules shown in FIG. 2 may be combined and/or further partitioned to similarly detect incorrect wiring of the telematics unit 24. Inputs to the module 76 may be sensed from the vehicle 12, received from other modules (not shown) within the vehicle 12 and/or determined/modeled by other sub-modules (not shown) within the telematics unit 24. In the example shown, wiring monitoring module 76 includes a constant power line monitoring module 80, an accessory power line monitoring module 82, and a fault notification module 84.

The following definitions apply when the GPS component 42 is initializing after a power transition from an off or sleeping state to a normal on state where the GPS component 42 would be available to the user. Hot Start is where a valid current almanac and current ephemeris are available to the system. Warm Start is where a valid current almanac is available to the GPS component 42 and a current ephemeris is not available to the GPS component 42. Cold Start is where a valid current almanac and current ephemeris are not available to the GPS component 42.

Constant power line monitoring module 80 monitors various conditions of the telematics unit 24 to detect whether the constant power line 74 is incorrectly wired. For example, constant power line monitoring module 74 receives as input a power on indication 86 and a valid GPS (Global Positioning System) indication 88. Based on the inputs 86, 88, constant power line monitoring module 80 performs one or more constant power line monitoring method to detect whether the constant power line 74 is incorrectly wired and to generate a constant power fault indication 90 when the constant power line 74 is found to be incorrectly wired.

For example, if the system has a valid constant power provided and is able to receive GPS signal, the initial state of a GPS solution will be valid GPS position. The system will then be able to calculate a valid GPS position starting from what is defined as a Warm Start or Hot Start upon a power transition from an off or sleeping state to a normal on state. This is an indication of a correctly wired constant power line 74. If the system does not have a valid constant power provided and is able to receive GPS signal, the initial state of a GPS solution will be invalid GPS position. The system will then be able to calculate a valid GPS position starting from what is defined as a Cold Start upon a power transition from an off or sleeping state to a normal on state. This is a potential indication of an incorrectly wired constant power line 74. Thus, a valid GPS indication is one where a current position solution is able to be determined by the system. In contrast, an invalid GPS indication is one where a position solution is not able to be determined by the system.

Figure 3:
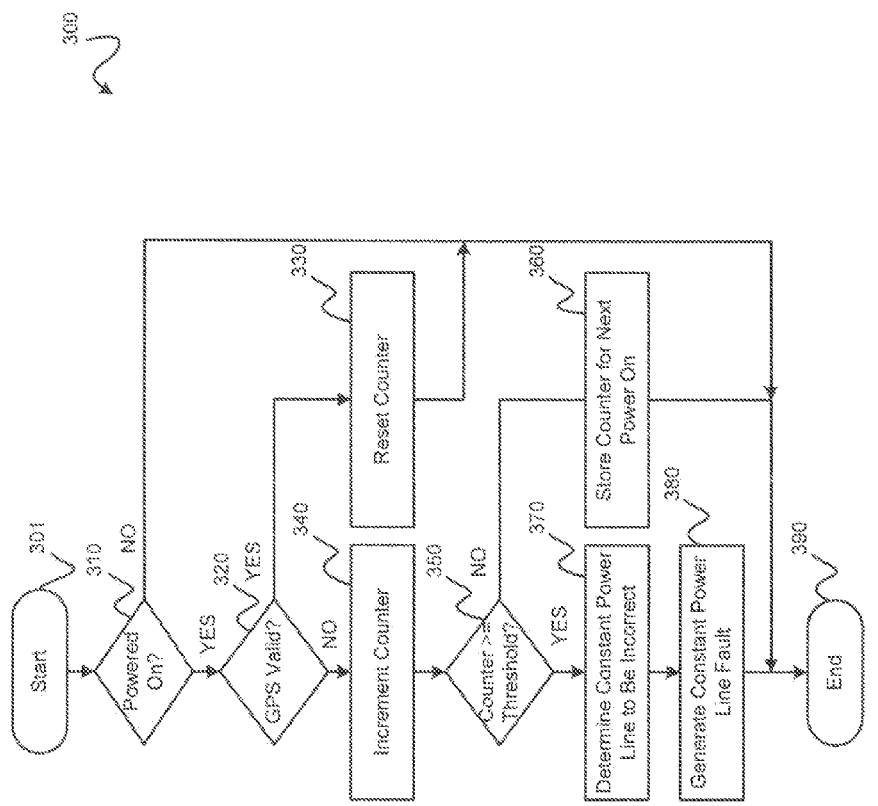

An exemplary constant power line monitoring method is shown at 300 in FIG. 3. As shown in FIG. 3 (and with continued reference to FIGS. 1 and 2), the constant power line monitoring method 300 may begin at 301. The power on indication 86 is evaluated at 310 to determine whether the telematics unit 24 is powered on. If the telematics unit 24 is not powered on at 310, the method may end at 390.

If, however, the telematics unit 24 is powered on at 310, the valid GPS indication 88 is evaluated at 320 to determine whether the GPS is valid. If the GPS is valid at 320, a counter is reset to zero at 330 and the method may end at 390. If, however, the GPS is invalid at 320, the counter is incremented at 340 and evaluated at 350 to determine whether the counter is greater than a threshold (e.g., an adjustable threshold representing a maximum number X of consecutive power cycles with invalid GPS, where X is an integer greater than two).

If, at 350, the counter is less than the threshold, then counter is stored for the next power cycle at 360 (e.g., in non-volatile data storage) and the method may end at 390. If, however the counter is greater than or equal to the threshold at 350 (i.e. greater than a maximum number X of consecutive power cycles with invalid GPS, where X is an integer greater than two), then it is determined that the constant power line 74 is incorrectly wired at 370 and the constant power line fault 90 is generated at 380. Thereafter, the method may end at 390.

With reference back to FIG. 2, accessory line monitoring module 82 monitors various conditions of the telematics unit 24 to detect whether the accessory power line 72 is incorrectly wired. For example, accessory line monitoring module 82 receives as input a power on indication 86, location data 92, and/or network data 94. The power on indication 86 is when the system is in a normal on state where the system would be available to the user. The location data 92 is defined as the results of the valid GPS position solution. A comparison of location data 92 over a period of time (multiple samples) is used to determine if the system is stationary. If the system is stationary the accessory power line 72 may be incorrectly wired. The network data 94 is the results of system information received from a cellular network that may be used to indicate location. Additionally, if the system remains on a same cellular network for a period of time, this is a potential indication the system is stationary. A comparison of location data 92 over a period of time (multiple samples) is used to determine if the system is stationary. If the system is stationary the accessory power line 72 may be incorrectly wired.

Figure 4:
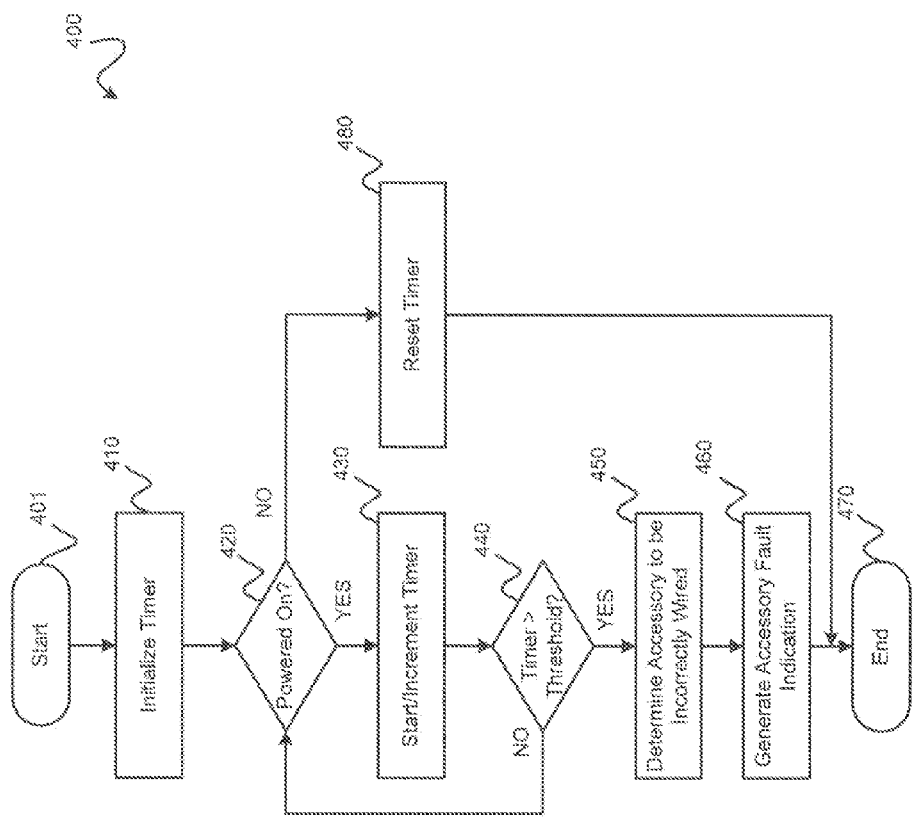

Based on the inputs 86, 92, 94, accessory line monitoring module 82 performs one or more accessory line monitoring methods to detect whether the accessory power line 72 is incorrectly wired and to generate an accessory line fault indication 96. An exemplary accessory line monitoring method is shown at 400 in FIG. 4. As shown in FIG. 4 (and with continued reference to FIGS. 1 and 2), the accessory line monitoring method 400 may begin at 401. A timer is initialized at 410. The power on indication 86 is evaluated at 420 to determine if the power is on. If the power is turned on at 420, the timer is started (or incremented based on the type of the counter) at 430. The timer is evaluated at 440 to determine if it has exceeded an adjustable threshold (e.g., a maximum consecutive time to be powered on). If the timer exceeds the threshold at 440, the accessory power line 72 is determined to be wired incorrectly at 450 and the accessory line fault indication 96 is generated at 460. Thereafter, the method may end at 470. If, however the timer is less than the threshold at 440, the method continues with monitoring the power on indication 86 at 420. If the power on indication 86 indicates the power is turned off at 420, the timer is reset at 480 and the method may end at 470.

Figure 5:
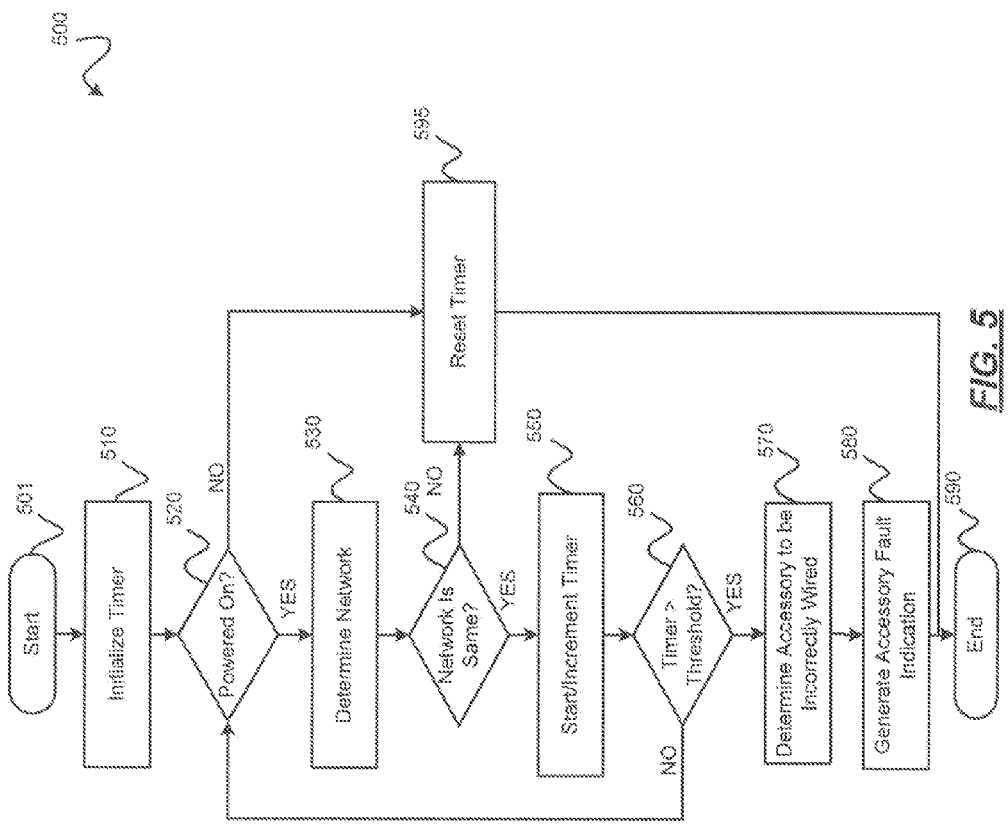

Another exemplary accessory monitoring method is shown at 500 in FIG. 5. The method 500 may begin at 501. A timer is initialized at 510. The power on indication 86 is evaluated at 520 to determine whether the power is on. If the power is turned on at 520, the network is determined based on the network data 94 at 530. If the network is the same as the previously determined network (i.e., the vehicle 12 has not moved out of the network) at 540, the timer is incremented (or started depending on the type of timer) at 550.

The timer is evaluated at 560. If the timer exceeds an adjustable threshold at 560, the accessory power line 72 is determined to be wired incorrectly at 570 and the accessory line fault indication 96 is generated at 580. Thereafter, the method may end at 590. If, however the timer is less than the threshold at 560, the method continues with monitoring the power on indication 86 at 520. If the power on indication 86 indicates the power is turned off at 520, the timer is reset at 595 and the method may end at 590.

Still another exemplary accessory monitoring method is shown at 600 in FIG. 6. The method 600 may begin at 601. A timer is initialized at 610. The power on indication is evaluated at 620. If the power is turned on at 620, the location is determined based on the location data at 630. If the location is the same as the previously determined location (i.e., the vehicle has not moved) at 640, the timer is incremented (or started depending on the type of timer) at 650.

The timer is evaluated at 660. If the timer exceeds an adjustable threshold (e.g., a maximum consecutive time to be powered on and in a same location) at 660, the accessory line is determined to be wired incorrectly at 670 and the accessory fault indication is generated at 680. Thereafter, the method may end at 690. If, however the timer is less than the threshold at 660, the method continues with monitoring the power on indication at 620. If the power on indication indicates the power is turned off at 620, the timer is reset at 695 and the method may end at 690.

With reference back to FIG. 2, fault notification module 84 monitors for constant power line faults or accessory faults. If either or both of the faults 90, 96 are generated, fault notification module 84 generates a fault notification 98 to alert a third party of the incorrect wiring. For example, the fault notification 86 can be in the form of a visual, audio, and/or textual warning message that is communicated by any of the components or combination of the components of the telematics system 10.

As can be appreciated in light of the disclosure, the order of operation within the methods shown is not limited to the sequential execution as illustrated in FIGS. 3-6, but may be performed in one or more varying orders as applicable and in accordance with the present disclosure. As can further be appreciated, one or more steps may be added or deleted from the methods without altering the spirit of the methods. In any of the methods, the methods can be scheduled to run based on predetermined events, and/or can run continually during operation of the telematics unit.

While at least one example has been presented in the foregoing detailed description, it should be appreciated that a vast number of variations exist. It should also be appreciated that the disclosed examples are not intended to limit the scope, applicability, or configuration of the disclosure in any way. Rather, the foregoing detailed description will provide those skilled in the art with a convenient road map for implementing the disclosed examples. It should be understood that various changes can be made in the function and arrangement of elements without departing from the scope of the disclosure as set forth in the appended claims and the legal equivalents thereof.

What is claimed is:

1. A method of detecting whether a constant power line of a telematics unit is incorrectly wired, comprising:
   evaluating a validity of a global positioning system;
   determining that the constant power line of the telematics unit is incorrectly wired based on the evaluating; and
   generating an alert signal indicating that the constant power line is incorrectly wired based on the determining.

2. The method of claim 1 wherein the validity of the GPS is based on whether a current position solution is able to be determined.

3. The method of claim 1 wherein the evaluating the validity is based on a powered on status of the telematics unit.

4. The method of claim 3 wherein the powered on status indicates that the telematics unit has been powered on.

5. The method of claim 1 wherein the determining comprises determining that the constant power line of the telematics unit is incorrectly wired when the validity is invalid.

6. The method of claim 1 further comprising tracking the validity of the GPS over consecutive power cycles, and wherein the determining comprises determining that the constant power line of the telematics unit is incorrectly wired when the validity is invalid over X power cycles, where X is an integer greater than two.

7. The method of claim 6 wherein the determining further comprises determining that the constant power line of the telematics unit is incorrectly wired when the validity is invalid over X consecutive power cycles, where X is an integer greater than two.

8. A method of detecting whether an accessory line of a telematics unit is incorrectly wired, comprising:
   evaluating a powered on status of the telematics unit;
   managing a timer based on the powered on status;
   determining at least one of a location and a network of the telematics unit;
   determining that the accessory line of the telematics unit is incorrectly wired based on the timer and the at least one of the location and the network; and
   generating an alert signal indicating that the accessory line is incorrectly wired based on the determining.

9. The method of claim 8 further comprising comparing the timer to a threshold and wherein the determining that the accessory line of the telematics unit is incorrectly wired is based on the comparing.

10. The method of claim 9 wherein the determining comprises determining that the accessory line of the telematics unit is incorrectly wired when the timer is greater than the threshold.

11. The method of claim 9 wherein the threshold is based on a time until before a battery can be drained.

12. The method of claim 8 wherein the determining the at least one of the location and the network comprises determining the location of the telematics unit and wherein the determining that the accessory line of the telematics unit is incorrectly wired is based on the location.

13. The method of claim 12 wherein the managing the timer is based on the location of the telematics unit.

14. The method of claim 13 wherein the managing the timer is based on the location of the telematics unit being in a same location.

15. The method of claim 14 wherein the managing the timer is based on the network of the telematics unit.

16. The method of claim 15 wherein the managing the timer is further based on the network of the telematics unit being a same network.

17. The method of claim 15 further comprising comparing the timer to a threshold and wherein the determining comprises determining that the accessory line of the telematics unit is incorrectly wired when the timer exceeds the threshold.

18. The method of claim 13 further comprising comparing the timer to a threshold and wherein the determining comprises determining that the accessory line of the telematics unit is incorrectly wired when the timer exceeds the threshold.

19. The method of claim 8 wherein the determining the at least one of the location and the network comprises determining the network of the telematics unit and wherein the determining that the accessory line of the telematics unit is incorrectly wired is based on the network.

20. A system for detecting whether a power line of a telematics unit is incorrectly wired, comprising:
   a first module that evaluates a validity of a global positioning system of the telematics unit; and
   a second module that determines that the power line of the telematics unit is incorrectly wired based on the validity of a global positioning system.

* * * * *